Patented June 20, 1950

2,512,251

UNITED STATES PATENT OFFICE 2,512,251

1-ARYL-5-PYRAZOLONE AZO COMPOUNDS

Richard D. Kleene, Somerville, N. J., assignor to American Cyanamid Company, New York, N. Y., a corporation of Maine No Drawing. Application August 30, 1947, Serial No. 771,571

14 Claims. (Cl. 260—163)

This invention relates to a method of preparing azo dyestuffs related to 1-aryl-5-pyrazolones.

An extensive series of commercially important azo dyes have been prepared using 1-phenyl-3-methyl-5-pyrazolone and its derivatives as coupling components. These dyestuffs are simply prepared and have desirable properties, and the low cost and ready accessibility of the coupling components renders them economically attractive. The 1-aryl-3-methyl-5-pyrazolones are readily prepared by reacting an aryl hydrazine with acetoacetic ester to produce the corresponding hydrazone and then cyclizing it.

The next lower homologs, 1-aryl-5-pyrazolones have heretofore been of no importance as dyestuff intermediates although dyestuffs prepared from these components have many desirable properties. The main reason why this series of dyestuffs has not proved of any practical value lies in the fact that 1-aryl-5-pyrazolones cannot be prepared readily. When it is attempted to carry out the same series of steps with formylacetic esters instead of acetoacetic ester the aryl hydrazone produced will not cyclize but undergoes undesirable side reactions. It has, therefore, been necessary hitherto to prepare 1-aryl-5-pyrazolones by various indirect methods involving decarboxylation and dealkylation reactions or dehydrogenation of the corresponding pyrazolidones. Yields are low in at least one step and, therefore, the cost of the resulting pyrazolones has precluded their practical use in azo dyestuffs.

There is another method of preparing 1-aryl-3-methyl-5-pyrazolone azo dyestuffs which consists in coupling acetoacetic esters with diazo compounds, reacting the azo compounds thus produced with an aryl hydrazine and then cyclizing. Unfortunately this method also is not applicable to the production of azo dyes from 1-aryl-5-pyrazolones because in this reaction also formylacetic ester reacts anomalously producing the so-called formazylformic ester which is not usable to prepare pyrazolones.

The present invention permits the production of azo dyes of 1-aryl-5-pyrazolones unsubstituted in the 3 position, which may be represented in general by the following formula:

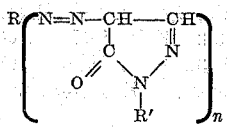

where R is a radical of a diazotizable aromatic amine, R' is an aryl radical which may be the same as, or different from, R, and n is 1 or 2.

The present invention is based on the discovery that formylacetic ester aryl hydrazones, (which it has been pointed out are not capable of cyclization to pyrazolones), couple readily with diazo compounds and that surprisingly the coupling reaction does not produce an alpha-(arylazo) formylacetic ester hydrazone but results in cyclization and the product obtained is a 4-arylazoprazolone. The products are in every way identical with those which are obtained by coupling the corresponding pyrazolone.

The coupling and cyclizatiton processes of the present invention are accomplished in a single step and it is not intended to limit the invention to a particular theory of action as the exact reaction mechanism has not been fully determined. It seems probable that the coupling precedes cyclization and that in some manner the arylazo substituent promotes ring closure of the pyrazolone. The nature of this effect of an arylazo substituent is not clearly known.

It will be apparent that the present invention provides a new, simple, and quite general method for the preparation of azo pyrazolone dyes unsubstituted in the 3-position. In fact, in some cases it is actually easier to prepare these dyes by the process of the present invention than it is to prepare the corresponding 3-methyl derivatives. The generality of the process of the present invention is one of its most important practical advantages. The reaction proceeds with a great variety of diazo compounds and of aryl groups in the hydrazones. In fact, the process is usable with practically all of the common diazotizable amines. Thus, for example, a series of water insoluble products may be obtained from the amines which are free of water solubilizing groups such as aniline, its homologs, their halogen, nitro, alkoxy, aryloxy, acylamino and cyano derivatives: xenylamine, the naphthylamines, heterocyclic amines, and aminoazo compounds. Furthermore, diamines in which only one of the amine groups can be diazotized, such as 2,6-dichloro-1,4-phenylenediamine, can be used as well as diamines in which both amino groups can be diazotized, such as benzidine and derivatives of 4,4'-diaminostilbene. The amines may be substituted by more than one group of different types, as in 2-methoxy-5-chloroaniline.

Another important class of diazo components useful in the present invention comprises the amines containing water solubilizing groups such as monoacetyl-p-phenylenediaminesulfonic acid, aminoazobenzenedisulfonic acid, p-aminobenzoic acid, orthanilic acid, sulfanilic acid, p-aminodiphenylamine-o-sulfonic acid, 4-aminophenol-2,6-disulfonic acid, 3-aminophenol-4-sulfonic acid, 4-aminophenol-2-sulfonic acid, 4-aminotoluene-2-sulfonic acid, p-anisidine-o-sulfonic acid, benzidine-o, o'-disulfonic acid, benzidine-m-sulfonic acid, o-chloro-m-aminobenzoic acid, 3-chloroaniline-6-sulfonic acid, p,p'-diaminodiphenic acid, p,p'-diaminodiphenylurea-m,m'-disulfonic acid, o-nitraniline-p-sulfonic acid, p-nitraniline-o-sulfonic acid, m-xylidine-o-sulfonic acid, m-xylidine-m-sulfonic acid, 1-naphthylamine-2-sulfonic acid, 1-naphthylamine-3-sulfonic acid, naphthionic acid, 1-naphthylamine-8-sulfonic acid, 4-nitro-1-naphthylamine-6-sulfonic acid, 1-naphthylamine-2,4-disulfonic acid, 1-naphthylamine-3,6-disulfonic acid, 2-naphthylamine-8-sulfonic acid, 2-naphthylamine-3,6-disulfonic acid, 2-naphthylamine-6,8-disulfonic acid, 2-amino-5-naphthol-7-sulfonic acid, 1-amino-8-naphthol-3,6-disulfonic acid, and 5-aminosalicylic acid.

Special interest attaches to water solubilized 4-aryl-azopyrazolones in which the diazo component contains a hydroxy or carboxy radical ortho to the amino group, since, as is well known, such dyes are metallizable. Typical of the amines which may be used in the preparation of such dyes are 2-amino-4-nitrophenol, 2-amino-5-nitrophenol, 2-amino-4-chlorophenol, 2-aminophenol-4-sulfonic acid, 2-amino-4-nitrophenol-5-sulfonic acid, 2-amino-4-nitrophenol-6-sulfonic acid, 2-amino-5-sulfobenzoic acid, anthranilic acid, 1-amino-2-naphthol-4-sulfonic acid, 1-amino-6-nitro-2-naphthol-4-sulfonic acid, 2-amino-4-methyl-6-nitrophenol, and 2-amino-4-methylphenol-6-sulfonic acid.

A great variety of formaldehyde ester hydrazones are likewise suited to the reaction. Typical are those derived from phenylhydrazine, o-chlorophenylhydrazine, p-chlorophenylhydrazine, 2,5-dichlorophenylhydrazine, p-bromophenylhydrazine, o-nitrophenylhydrazine, p-nitrophenylhydrazine, o-tolylhydrazine, benzylhydrazine, p-ethylphenylhydrazine, 1-naphthylhydrazine, 2-naphthylhydrazine, zenylhydrazine, 2-hydrazinofluorene, 4-hydrazinostilbene, p-methoxyphenylhydrazine, 2-hydrazinobenzoic acid, 4-hydrazinobenzoic acid, 3-nitrophenylhydrazine-6-sulfonic acid, phenylhydrazine-p-sulfonic acid, 1-hydrazinonaphthalene-4-sulfonic acid, 8-hydrazinonaphthalene-1-sulfonic acid, and 4,4'-dihydrazinobiphenyl-2,2'-disulfonic acid.

The new series of dyes obtainable by the present invention range from azoic pigments, to soluble dyes, lakes, and substantive dyes. Where a diazo compound contains a metallizable group ortho to the azo group such as a hydroxy or amino group the resulting dye will be metallizable and may be used to prepare metallized pigments or in various processes to produce metallized dyes, for example, by preparing preformed metal complexes of the dye or by following the metachrome, top chrome or bottom chrome processes.

It is an advantage of the present invention that the technique of diazotization is not affected by the present invention and the conditions may be used which are known to be suitable for the particular diazotizable amines.

The hydrazones of formylacetic ester are prepared by the well known methods and in this respect also the invention does not depart from well known and tested procedures. If desired the hydrazone may be isolated but since the coupling and cyclizing step proceeds smoothly without isolation of the hydrazone this modification is preferred and constitutes an additional advantage of the present invention as it avoids the added cost of isolation of the hydrazone. In spite of the surprising result which is obtained when coupling the diazo compound to the hydrazone the manipulative technique of the step does not depart from that which is customarily used. Of course, the method of coupling will vary with the components and with the intended use of the product as is the case with all azo dyes. It is preferable to effect coupling in aqueous or alcoholic solutions and alkaline conditions are also advantageous.

When insoluble products are prepared they may be filtered off after coupling. In the case of dyes containing solubilizing groups recovery is effected by known methods involving adjustment of the pH and salting out. Where metal complexes are desired the metallization may be effected by ordinary methods and it is an advantage that in many cases it is feasible to produce the metal complex without isolation of the unmetallized dye which results in an additional economic advantage.

The invention will be described in greater detail in the following examples which are typical illustrations of the variety of ways in which the present invention may be carried out. The parts are by weight.

EXAMPLES

Example 1

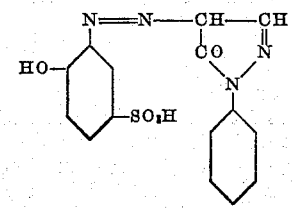

The phenylhydrazone of ethyl formylacetate is prepared by the slow addition at 10° C. of a solution of 13.8 g. parts of sodium formylacetic ethyl ester in 50 parts of water, to a solution of 14.4 parts of phenylhydrazine hydrochloride in 100 parts of water. The hydrazone rapidly separates as an oil, which may be crystallized from alcohol, though this is usually not necessary.

o-Aminophenol-p-sulfonic acid (44.5 parts) is suspended in 500 parts of water and neutralized with 10% sodium carbonate. The solution is acidified with 69 parts of 38% hydrochloric acid, cooled to 10–15° C., and diazotized with 5N sodium nitrite solution. 49 parts of formylacetic ethyl ester phenylhydrazone is suspended in 235 parts of cold 10% sodium carbonate solution, and treated with the diazo solution. Reaction is immediate. This operation is accompanied by the addition of 60 parts of 5 N sodium hydroxide. After completion of addition the solution is treated with 20 parts of soda ash and stirred until coupling is complete.

The dye solution is warmed to 85° and treated with 50 parts of glacial acetic acid and 100 parts of salt. The product is filtered and washed.

Ten parts of the dye are metallized by refluxing in water solution with 1.86 parts of chromic acetate and 60 parts of N sulfuric acid. The product is a fine crystalline powder, dyeing wool orange.

1-phenyl-5-pyrazolone was coupled with diazotized o-aminophenol-p-sulfonic acid and the product metallized as above. Complete elementary analysis, absorption spectrum, and the dyeing properties showed the identity of the two dyes.

Example 2

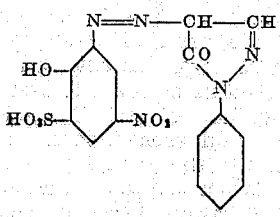

A solution of 11.7 parts of 4-nitro-2-aminophenol-6-sulfonic acid and 2.65 parts of sodium carbonate in 200 parts of water is treated with 25 parts of 5 N hydrochloric acid, cooled, and diazotized with 5 N sodium nitrite solution.

Formylacetic ethyl ester phenylhydrazone is prepared as in Example 1 from 7.7 parts sodium formylacetic ethyl ester, 7.2 parts phenylhydrazine hydrochloride, and 100 parts of water. The water is decanted and the phenylhydrazone dissolved in 20 parts of ethanol and 23 parts of concentrated ammonia. The resulting solution is diluted to the volume of 100 parts of water, cooled, and treated slowly with the diazo. When the addition is finished, the solution is stirred until coupling is complete, and acidified with 17 parts of 5 N sulfuric acid. The precipitated dye is filtered, washed, and dried at 60° C.

Ten parts of the dye is dissolved in 200 parts of water and metallized in a refluxing solution of 10 parts of 5 N sulfuric acid and 75 parts of 0.68 molar chromic acetate. The product is filtered and dried at 60° C. It dyes wool a bright orange of superior fastness properties.

4-nitro-2-aminophenol-6-sulfonic acid was diazotized and coupled with 1-phenyl-5-pyrazolone. The resulting dye was metallized as above and proved in every way identical with the dye prepared from formylacetic ethyl ester phenylhydrazone.

Example 3

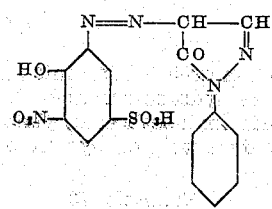

6-nitro-2-aminophenol-4-sulfonic acid is diazotized and reacted with formylacetic ethyl ester phenylhydrazone, substantially according to the procedure of Example 2, the dye being metallized as described. The product dyes wool a brilliant orange of good fastness. It proved identical with the product prepared from 6-nitro-2-aminophenol-6-sulfonic acid and 1-phenyl-5-pyrazolone.

Instead of formylacetic ethyl ester, the methyl, isopropyl, or butyl ester may be used in this preparation.

Example 4

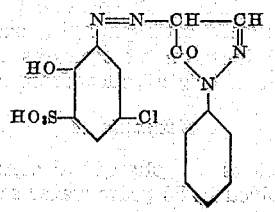

4-chloro-2-aminophenol-6-sulfonic acid is diazotized and reacted with the phenylhydrazone of formylacetic ethyl ester, according to the general procedure of Example 2. The resulting dye is metallized with chromic acetate as described, and dyes wool a bright red of excellent fastness properties. The same product was obtained when 1-phenyl-5-pyrazolone was used instead of the phenylhydrazone.

Example 5

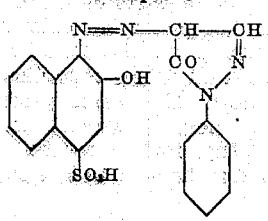

Formylacetic ethyl ester phenylhydrazone is prepared as described in Example 1 from 28.8 parts phenylhydrazine hydrochloride, 27.6 parts sodium formylacetic ethyl ester, and 300 parts water. This is treated with 42.4 parts sodium carbonate and then with stirring with 50 parts diazotized 1-amino-2-naphthol-4-sulfonic acid. This is carried out in the cold. When addition is complete, the solution is treated with 40 parts 5 N sodium hydroxide solution and allowed to stand overnight. It is then heated to 60° and acidified with 90 parts concentrated hydrochloric acid. The precipitated dye is filtered and washed.

A solution of 20.3 parts of the dye in 184 parts of water is refluxed with 74 parts 0.68 molar chromic acetate and 25 parts of 80% formic acid; during the process 11 parts concentrated hydrochloric acid is added. The dye separates as glistening leaflets with a metallic luster. It dyes wool a bright pink of good fastness and levelling properties. The same dye was obtained from 1-phenyl-5-pyrazolone.

Instead of ethyl formylacetate, the methyl or butyl ester may be used in this preparation.

Example 6

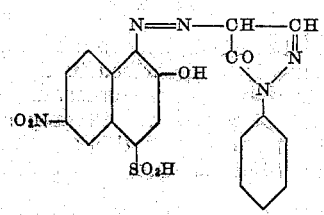

Diazotized 6-nitro-1-amino-2-naphthol-4-sulfonic acid is reacted with formylacetic ethyl ester phenylhydrazone, and the product metallized, according to the procedure of Example 5. The resulting dye colors wool red. The same dye was obtained from 1-phenyl-5-pyrazolone.

Example 7

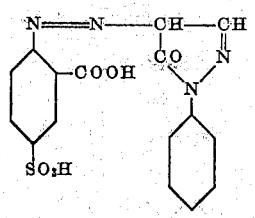

A solution of 7.0 parts 5-sulfoanthranilic acid and 40 parts 10% sodium carbonate solution in 100 parts of water is acidified with 10 parts of 38% hydrochloric acid, cooled, and diazotized with 5 N sodium nitrite. This is reacted with formylacetic ethyl ester phenylhydrazone prepared as in Example 1 from 4.6 parts sodium formylacetic ethyl ester and 4.8 parts phenylhydrazine hydrochloride. After addition is complete, warming to 50° and acidification with 11 parts 5 N sulfuric acid cause precipitation of the dye. This is filtered, and the wet cake metallized directly in 225 parts of water by refluxing with 75 parts 0.68 molar chromic acetate and 5 parts 5 N sulfuric acid. Evaporation is necessary to cause separation of the metallized dye. This dyes wool yellow. The same product was obtained from 1-phenyl-5-pyrazolone.

Instead of ethyl formylacetate, the isopropyl or butyl ester may be used in this experiment.

Example 8

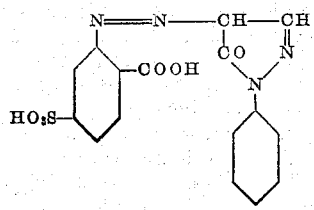

4-sulfoanthranilic acid is diazotized and coupled with formylacetic ethyl ester phenylhydrazone, and the product metallized, according to the procedure of Example 7. The product dyes wool a dull yellow.

The same results are obtained when methyl or propyl formylacetate is used instead of the ethyl ester.

Example 9

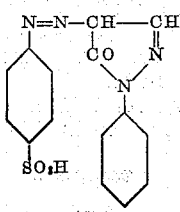

Formylacetic ethyl ester phenylhydrazone is prepared exactly as described in the first paragraph of Example 1, and dissolved in 40 parts ethanol and 45 parts concentrated ammonium hydroxide. A fraction of this solution equal to 63% of the whole is used in the following reaction.

A solution of 11 parts sulfanilic acid, 50 parts 5% sodium carbonate solution, and 100 parts water, is filtered, cooled, and diazotized by the addition of 3.5 parts of sodium nitrite dissolved in 20 parts water followed by 12.5 parts of 5 N hydrochloric acid. This is added slowly to the phenylhydrazone aliquot. The solution is heated to 50° and acidified, the dye separating as a yellow solid. In an acid bath it dyes wool a bright yellow of moderately good fastness.

Example 10

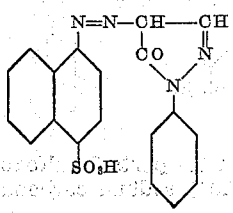

Formylacetic ethyl ester phenylhydrazone is prepared according to the first paragraph of Example 1 and dissolved in 40 parts of ethanol and 45 parts concentrated ammonium hydroxide.

A filtered solution of 24.5 parts sodium naphthionate in 150 parts of water is cooled and treated with 25 parts concentrated hydrochloric acid. The resulting slurry is treated slowly with 18 parts 5 N sodium nitrate. The solid diazonium salt is filtered and washed, then being added in small portions to the phenylhydrazone solution. The solution is warmed to 50° and acidified with 40 parts of 38% hydrochloric acid, cooled, filtered, and dried. The product dyes wool orange from an acid bath.

Example 11

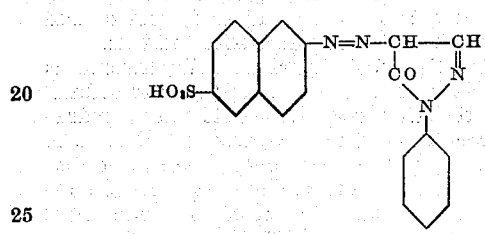

2-naphthylamine-6-sulfonic acid is diazotized by the procedure of Example 9, and the diazo solution reacted with formylacetic ethyl ester phenylhydrazone. The dye, which is isolated by acidification with sulfuric acid, dyes wool orange-yellow from an acid bath.

The same results are obtained when methyl or butyl formylacetate is used instead of the ethyl ester.

Example 12

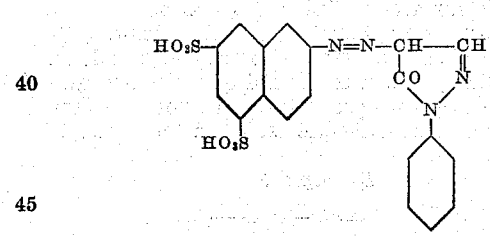

2-naphthylamine-5,7-disulfonic acid is dissolved in dilute hydrochloric acid, diazotized, and reacted with formylacetic ester phenylhydrazone. The product dyes wool orange from an acid dye bath.

Example 13

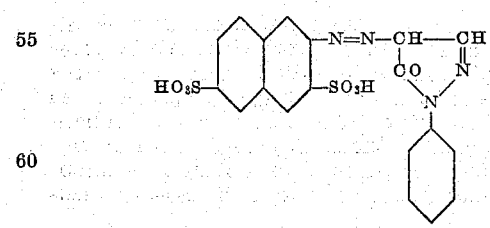

The disodium salt of 2-naphthylamine-3,6-disulfonic acid is dissolved in water and acidified with hydrochloric acid. The slurry is diazotized with sodium nitrite and the diazo reacted with formylacetic ethyl ester phenylhydrazone in ammonia. Acidification precipitates the product, which dyes wool bright yellow from an acid bath.

Example 14

Twenty parts of phenylhydrazine-p-sulfonic acid is dissolved in 50 parts water and treated in the cold with a solution of 50 parts water containing 13.8 parts sodium formylacetic ethyl ester. On standing, the solution deposits the p-sulfophenylhydrazone, which may be filtered and dried. In the preparation of dyes, the hydrazone need not be isolated, but the freshly prepared solution used directly.

Example 15

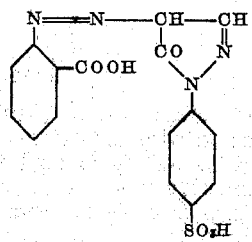

A solution of 13.7 parts anthranilic acid in 200 parts water and 14 parts concentrated hydrochloric acid is cooled and diazotized with 5 N sodium nitrite solution. Formylacetic ethyl ester p-sulfophenylhydrazone is prepared as in Example 14, treated with 20 parts 5 N sodium hydroxide solution and 20 parts sodium carbonate, and coupled by slow addition of the diazo. When coupling is complete, the solution is warmed to 50° C. and treated with 51.4 parts concentrated hydrochloric acid. The dye is filtered and dried. It is metallized by refluxing with chromic acetate in dilute sulfuric acid. The product dyes wool a bright yellow of orange shade, of good fastness and excellent levelling properties.

Example 16

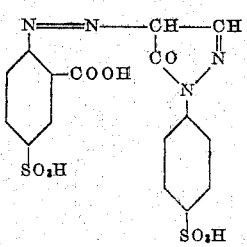

Formylacetic ethyl ester p-sulfophenylhydrazone is reacted with diazotized 5-sulfoanthranilic acid. After metallization with chromic acetate in dilute sulfuric acid, the product dyes wool yellow.

Example 17

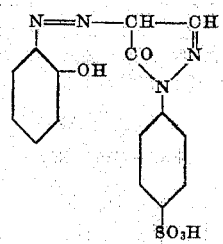

A suspension of 10.9 parts o-aminophenol in 100 parts water and 60 parts concentrated hydrochloric acid is warmed to solution, cooled and diazotized with 5 N sodium nitrite solution. Formylacetic ethyl ester p-sulfophenylhydrazone is prepared on one-third the scale of Example 14, treated with 20 parts sodium carbonate, and reacted by slow addition of the diazo. The product is precipitated by adding hydrochloric acid, filtered, and dried. Metallization of 3.6 parts product is carried out by refluxing in 100 parts water, 20 parts 0.7 N chromic acetate, and 5 parts 5 N sulfuric acid. The metallized product dyes wool orange.

Example 18

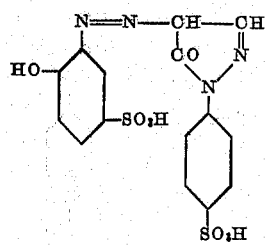

Formylacetic ethyl ester p-sulfophenylhydrazone is prepared as in Example 13 and reacted with diazotized 2-aminophenol-4-sulfonic acid. The product, after metallization is dilute sulfuric acid with chromic acetate, dyes wool a brilliant orange.

Example 19

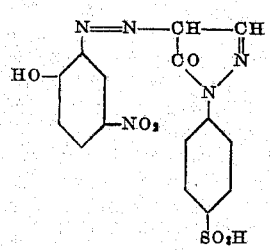

A solution of 28 parts 2-amino-4-nitrophenol in 500 parts water and 53 parts concentrated hydrochloric acid is cooled and diazotized with 5 N sodium nitrite. Formylacetic ethyl ester p-sulfophenylhydrazone, prepared on twice the scale of Example 14, is treated with 20 parts 5 N sodium hydroxide and 20 parts sodium carbonate, and then reacted by slow addition of the diazo. The solution is stirred until coupling is complete and the product filtered, washed, and dried.

Ten parts of the product is metallized by refluxing with 53 parts 0.7 molar chromic acetate and 10 parts 5 N sulfuric acid, and dyes wool a bright orange of good light fastness.

Example 20

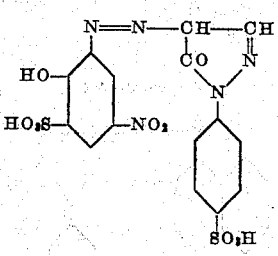

The diazo compound prepared from 23.4 parts 4-nitro-2-aminophenol-6-sulfonic acid according to the procedure of Example 2, is coupled with formylacetic ethyl ester p-sulfophenylhydrazone prepared according to Example 14, the hydrazone being treated with 30 parts sodium carbonate before and during reaction.

The mixture is then warmed to 90° and slowly cooled, whereupon the product crystallizes out, and is filtered and dried.

Ten parts of product is dissolved in 150 parts water and refluxed overnight with 52 parts of 0.7 molar chromic acetate. The dye is isolated by evaporation of the solution, and dyes wool orange shades.

*Example 21*

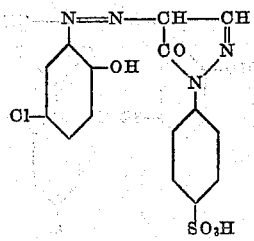

4-chloro-2-aminophenol (28.8 parts) is suspended in 120 parts water and 60 parts 38% hydrochloric acid. After cooling, diazotization is effected with 5 N sodium nitrite and the solution filtered, and slowly added to formylacetic ethyl ester p-sulfophenyl-hydrazone, prepared on twice the scale of Example 14 and treated with 20 parts sodium acetate and 30 parts sodium carbonate. During the reaction 50 parts 5 N sodium hydroxide is added. Then 12 parts of concentrated hydrochloric acid is added and the slurry filtered, washed, and dried. Metallization of 76 parts of dye is effected by dissolving in 600 parts water and refluxing with 280 parts 0.7 molar chromic acetate solution, 40 parts 5 N sulfuric acid being added during refluxing. The metallized dye crystallizes from solution and is filtered. It dyes wool a bright red of yellowish shade.

*Example 22*

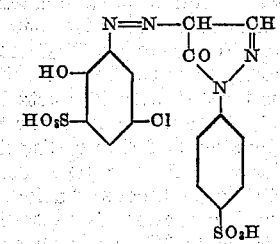

4-chloro-2-aminophenol-6-sulfonic acid is diazotized and coupled with formylacetic ethyl ester p-sulfophenylhydrazone. After metallization with chromic acetate and sulfuric acid, the product dyes wool a red of yellowish shade and good light fastness.

*Example 23*

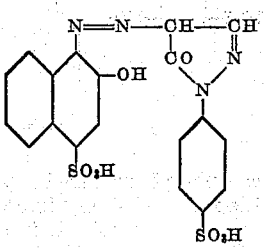

The p-sulfophenylhydrazone of ethyl formylacetate is reacted in the presence of sodium carbonate with the diazo oxide of 1-amino-2-hydroxynaphthalene-4-sulfonic acid. After metallization in sulfuric acid with chromic acetate, the product dyes wool pink.

*Example 24*

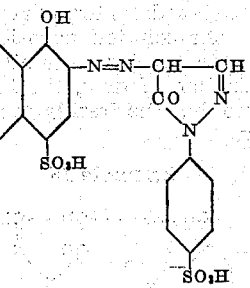

Formylacetic ethyl ester p-sulfophenylhydrazone is reacted with diazotized 1-hydroxy-2-aminonaphthalene-4-sulfonic acid in the presence of sodium carbonate. After metallization in sulfuric acid with chromic acetate, the product dyes wool pink.

*Example 25*

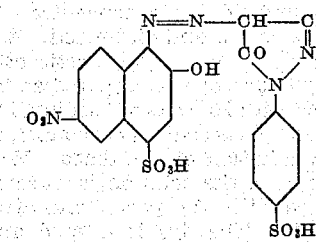

Formylacetic ester p-sulfophenylhydrazone is reacted in the presence of sodium carbonate with diazotized 6-nitro-1-amino-2-hydroxynaphthalene-4-sulfonic acid. The product is metallized in sulfuric acid with chromic acetate and dyes wool red shades.

*Example 26*

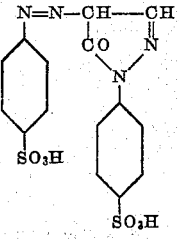

Sulfanilic acid is diazotized exactly as in Example 9 and added slowly to formylacetic ethyl ester p-sulfophenylhydrazone, prepared exactly as in Example 14 and treated with 20 parts sodium carbonate. When reaction is complete the solution is warmed to 50° and acidified with 42 parts concentrated hydrochloric acid. The product is cooled, filtered, and dried at 60° C. It dyes wool bright yellow from an acid bath, the shade being of good fastness.

*Example 27*

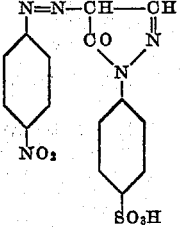

p-Nitroaniline is diazotized and reacted with formylacetic ethyl ester p-sulfophenylhydrazone. The product is isolated by acidification and dyes wool yellow from an acid bath.

Example 28

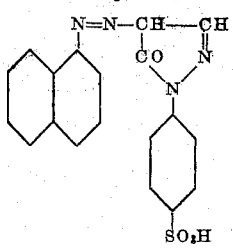

1-naphthylamine is diazotized and reacted with formylacetic ethyl ester p-sulfophenylhydrazone. The product dyes wool orange shades from an acid bath.

Example 29

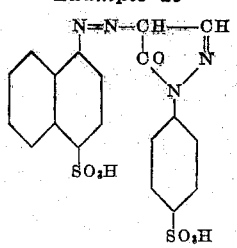

Naphthionic acid is diazotized exactly as described in Example 10 and added slowly to formylacetic ethyl ester p-sulfophenylhydrazone prepared exactly as in Example 14 and treated with 30 parts sodium carbonate. When reaction is complete the product is isolated by acidification with 56 parts 38% hydrochloric acid. It dyes wool orange shades from an acid bath.

Example 30

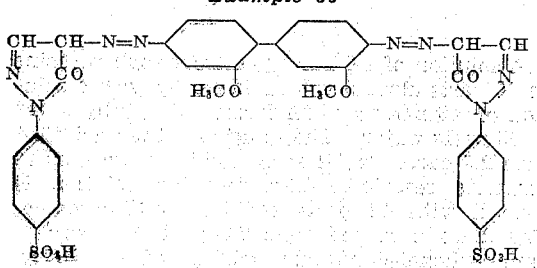

A solution of 12.2 parts 2,3'-dimethoxybenzidine in 60 parts 5 N hydrochloric acid is iced to 0–5° and tetrazotized with 5 N sodium nitrite. Formylacetic ethyl ester p-sulfophenylhydrazone is prepared exactly as in Example 14, treated with 20 parts sodium carbonate, 20 parts 5 N sodium hydroxide solution, and 80 parts water, and then reacted by slow addition of the tetrazo. During the coupling a further 20 parts of 5 N sodium hydroxide is added. The product is isolated by acidification with dilute sulfuric acid and filtration, and dyes wool Bordeaux shades from an acid bath.

Example 31

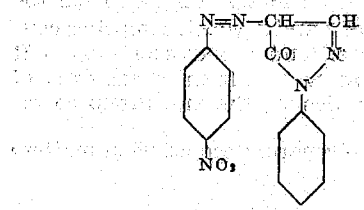

Formylacetic ethyl ester phenylhydrazone is prepared exactly as in Example 1 and dissolved in 40 parts alcohol and 45 parts concentrated ammonia.

Seven parts p-nitroaniline is dissolved in 50 parts and 26 parts concentrated hydrochloric acid. The solution is iced, diazotized with N sodium nitrite, and filtered.

Half the above prepared hydrazone solution is diluted to the volume of 100 parts water, cooled, and treated slowly with the diazo. The product separates as a bright orange precipitate. When the coupling is complete the product is filtered, washed, and dried at 60°. This pigment gives an orange ink in linseed varnish.

Example 32

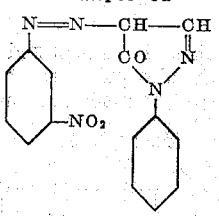

m-Nitroaniline is diazotized and reacted with formylacetic ethyl ester phenylhydrazone substantially by the procedure of Example 31. An orange pigment is obtained.

Example 33

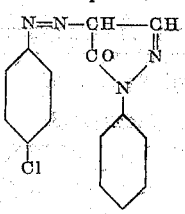

Formylacetic ethyl ester phenylhydrazone is prepared exactly according to the procedure of Example 1, and dissolved in 40 parts alcohol and 45 parts concentrated ammonia.

A solution of 8.2 parts p-chloroaniline hydrochloride in 100 parts water is cooled to 10°, treated with 18 parts 38% hydrochloric acid and 200 parts ice-water, and diazotized with N sodium nitrite.

One-half the above prepared hydrazone solution is diluted to the volume of 100 parts water, cooled, and treated slowly with the diazo. When the reaction is complete the product is filtered, washed, and dried at 60°. An orange pigment is obtained.

Example 34

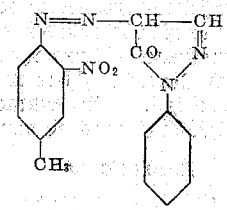

2-nitro-4-methylaniline is diazotized and reacted with formylacetic ethyl ester phenylhydrazone. A bright orange pigment is obtained.

Example 35

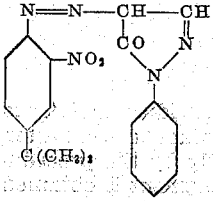

o-Nitro-p-tert butylaniline is diazotized and reacted with formylacetic ethyl ester phenylhydrazone. The product is a bright orange pigment.

Example 36

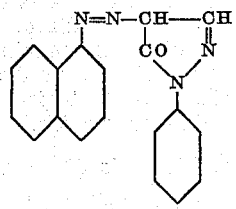

1-naphthylamine is diazotized and reacted with the formylacetic ethyl ester phenylhydrazone. An orange pigment is obtained.

Example 37

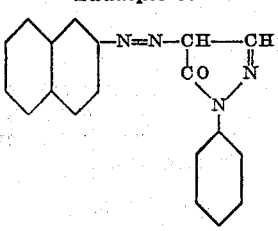

2-naphthylamine is diazotized and reacted with formylacetic ethyl ester phenylhydrazone. An orange pigment is obtained.

Example 38

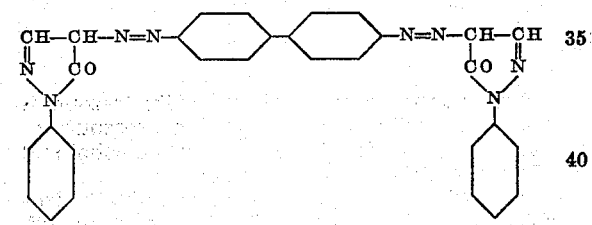

Formylacetic ethyl ester phenylhydrazone is prepared exactly as in Example 1, and dissolved in 40 parts alcohol and 45 parts concentrated ammonia.

A solution of 14.3 parts benzidine hydrochloride in 100 parts water is iced to 0°, treated with 33 parts 5 N hydrochloric acid, and diazotized with 20 parts 5 N sodium nitrite. When diazotization is complete the solution is treated with sulfamic acid and filtered.

The above prepared hydrazone solution is diluted to the volume of 200 parts water and treated slowly with the tetrazo. When reaction is complete, the slurry is filtered and the product washed thoroughly and dried. The pigment obtained gives a maroon ink in linseed oil varnish.

Example 39

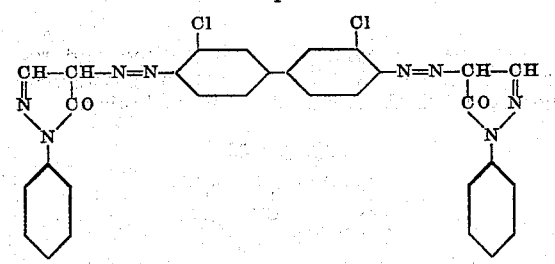

3,3'-dichlorobenzidine is tetrazotized and reacted with formylacetic ethyl ester phenylhydrazone substantially by the procedure of Example 38. A maroon pigment is obtained.

Example 40

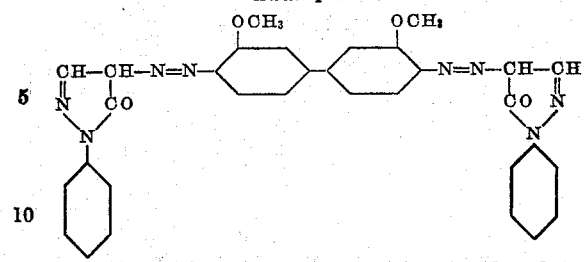

3,3'-dimethoxybenzidine is tetrazotized and reacted with formylacetic ethyl ester phenylhydrazone substantially by the procedure of Example 38. A maroon pigment is obtained.

The same results are obtained with propyl formylacetate.

Example 41

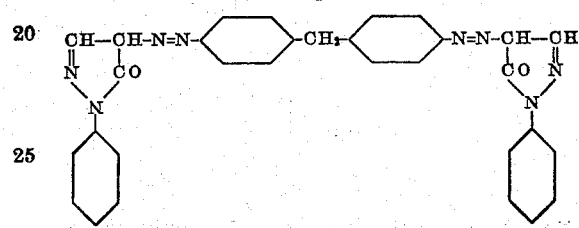

Example 42

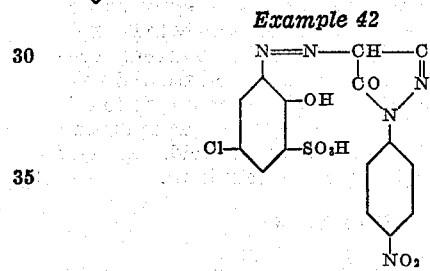

A solution of 4.6 parts p-nitrophenylhydrazine in 20 parts alcohol is treated slowly with a solution of 4.6 parts sodium formylacetic ethyl ester in 25 parts water. The solution is then acidified with 2.3 parts glacial acetic acid and warmed to complete reaction. The resulting solution is treated with 18 parts concentrated ammonia. The diazo prepared from 7.3 parts 4-chloro-2-amino-phenol-6-sulfonic acid is added slowly. On acidification with dilute sulfuric acid the dye separates.

After metallization in dilute sulfuric acid with chromic acetate, the product dyes wool red shades.

I claim:

1. A process of preparing azo coloring matters of the formula

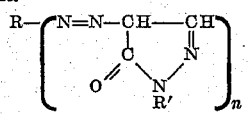

in which R is the residue of a diazotizable amine, R' is aryl and n is an integer selected from the group consisting of 1 and 2, which comprises coupling the diazotized amine corresponding to R with an arylhydrazone of a formylacetic ester of a lower aliphatic alcohol, the aryl group corresponding to R'.

2. A process of preparing azo coloring matters of the formula

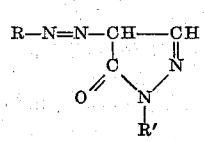

in which R is the residue of a diazotizable amine, R' is aryl which comprises coupling the diazotized amine corresponding to R with an arylhydrazone of a formylacetic ester of a lower aliphatic alcohol, the aryl group corresponding to R'.

3. A process according to claim 2 in which the diazotizable amine is an amine of the naphthalene series.

4. A process according to claim 2 in which the diazotizable amine is an amine of the naphthalene series and the aryl radical is a mononuclear radical of the benzene series.

5. A process according to claim 2 in which the aryl radical is monosulfophenyl.

6. A process according to claim 2 in which the diazotizable amine is an amine of the naphthalene series and the aryl radical is phenyl.

7. A process according to claim 1 in which $n$ is 2, the diazotizable amine is a tetrazotized amine of the biphenyl series.

8. A process according to claim 1 in which $n$ is 2, the diazotizable amine is a tetrazotized amine of the biphenyl series, and the aryl radical is a mononuclear radical of the benzene series.

9. A process according to claim 1 in which $n$ is 2, the diazotizable amine is a tetrazotized amine of the biphenyl series and the aryl radical is monosulfophenyl.

10. A process according to claim 1 in which the aryl radical is monosulfophenyl.

11. A process according to claim 2 in which the diazotizable amine is a mononuclear amine of the benzene series.

12. A process according to claim 2 in which the diazotizable amine is a mononuclear amine of the benzene series and the aryl radical is a mononuclear radical of the benzene series.

13. A process according to claim 2 in which the diazotizable amine is a mononuclear amine of the benzene series and the aryl radical is monosulfophenyl.

14. A process according to claim 2 in which the aryl radical is phenyl.

RICHARD D. KLEENE.

REFERENCES CITED

The following references are of record in the file of this patent:

UNITED STATES PATENTS

| Number | Name | Date |
|---|---|---|
| 935,370 | Julius et al. | Sept. 28, 1909 |
| 969,428 | Volkmann | Sept. 6, 1910 |
| 1,166,346 | Geldermann et al. | Dec. 28, 1915 |
| 2,155,001 | Schmid | Apr. 18, 1939 |
| 2,391,180 | McNally et al. | Dec. 18, 1945 |

FOREIGN PATENTS

| Number | Country | Date |
|---|---|---|
| 532 | Great Britain | of 1910 |
| 5,693 | Great Britain | of 1893 |
| 585,780 | Great Britain | Feb. 24, 1937 |

OTHER REFERENCES

Wisclicenus, Ann. 316, 24, 25 (1901).
Michall, Chemische Berichte, 38, 2096 (1904).